(12) United States Patent
Stuckey et al.

(10) Patent No.: US 8,731,871 B2
(45) Date of Patent: May 20, 2014

(54) TIRE MOLD DESIGN METHOD TO MINIMIZE UNIQUE ANNULAR MOLD PARTS

(75) Inventors: Jon I. Stuckey, Louisville, OH (US); John P. Rodak, NW Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 845 days.

(21) Appl. No.: 12/887,955

(22) Filed: Sep. 22, 2010

(65) Prior Publication Data

US 2012/0072180 A1 Mar. 22, 2012

(51) Int. Cl.
*G06F 17/50* (2006.01)
*B29L 30/00* (2006.01)
*B29L 31/00* (2006.01)

(52) U.S. Cl.
CPC ........ *G06F 17/5095* (2013.01); *G06F 17/5086* (2013.01); *G06F 2217/41* (2013.01); *B29L 2030/00* (2013.01); *B29L 2031/757* (2013.01)
USPC ........................................ 703/1; 703/7; 703/8

(58) Field of Classification Search
CPC . G06F 17/50; G06F 17/5086; G06F 17/5095; G06F 2217/41; B60C 99/006; B29D 30/00; B29L 2030/00; B29L 2031/757
USPC ..................... 703/1; 425/35, 36, 46, 47, 28.1; 264/326
See application file for complete search history.

(56) References Cited

U.S. PATENT DOCUMENTS

| | | | |
|---|---|---|---|
| 3,999,907 A | 12/1976 | Pappas | |
| 4,378,327 A | 3/1983 | Beneze | |
| 4,470,790 A | 9/1984 | Harada et al. | |
| 4,553,918 A | 11/1985 | Yoda et al. | |
| 4,726,749 A | 2/1988 | Katsumata | |
| 4,792,379 A | 12/1988 | Magee et al. | |
| 4,895,692 A | 1/1990 | Laurent et al. | |
| 5,163,501 A | 11/1992 | Tanaka et al. | |
| 5,204,036 A | 4/1993 | MacMillan | |
| 5,234,326 A | 8/1993 | Galli et al. | |
| 5,246,049 A * | 9/1993 | Ramcke et al. | ............ 152/209.3 |
| 5,290,163 A | 3/1994 | Katsumata et al. | |
| 5,340,294 A | 8/1994 | Kata | |
| 5,368,799 A | 11/1994 | Galli et al. | |
| 5,494,551 A | 2/1996 | Stevens | |
| 5,769,990 A | 6/1998 | Hoffmeister | |
| 5,843,826 A | 12/1998 | Hong | |

(Continued)

FOREIGN PATENT DOCUMENTS

| | | |
|---|---|---|
| JP | 63-202410 | 8/1988 |
| JP | 0-8002211 | 1/1996 |

(Continued)

OTHER PUBLICATIONS

Kang, Hyung Seok, International Search Report with Written Opinion from PCT/US2011/049719, 8 pp. (Apr. 20, 2012).

*Primary Examiner* — Kamini S Shah
*Assistant Examiner* — Luke Osborne

(57) ABSTRACT

A tire mold design method includes determining the values and parameters of various mold components used in a mold and utilizing these mold components in a mold. The parameters of the mold components may vary in length and edge geometry, amongst other things. Additionally, the number of mold components utilized in a mold may vary. Optionally, various mold components may be rotated 180 degrees.

20 Claims, 10 Drawing Sheets

(56) References Cited

U.S. PATENT DOCUMENTS

| | | | |
|---|---|---|---|
| 5,866,171 | A | 2/1999 | Kata |
| 6,196,818 | B1 | 3/2001 | Coleman et al. |
| 6,220,844 | B1 | 4/2001 | Kusano |
| 6,250,901 | B1 | 6/2001 | Nagata |
| 6,382,943 | B1 | 5/2002 | Metz et al. |
| 6,399,005 | B1 | 6/2002 | Kikuchi |
| 6,416,304 | B1 | 7/2002 | Tanaka et al. |
| 6,426,482 | B1 | 7/2002 | Fike |
| 6,491,854 | B1 | 12/2002 | Sano |
| 6,592,807 | B2 | 7/2003 | Tuttle et al. |
| 6,746,227 | B2 | 6/2004 | Helle et al. |
| 6,826,819 | B1 * | 12/2004 | Sinfield .................. 29/463 |
| 6,932,589 | B2 | 8/2005 | Suzuki |
| 6,936,203 | B2 | 8/2005 | Reilly et al. |
| 6,955,782 | B1 | 10/2005 | Ratliff, Jr. |
| 7,001,163 | B2 | 2/2006 | McBride et al. |
| 7,025,581 | B2 | 4/2006 | Kata |
| 7,201,570 | B2 * | 4/2007 | Ohara ...................... 425/46 |
| 2001/0048182 | A1 * | 12/2001 | Caretta et al. ............ 264/337 |
| 2005/0084554 | A1 | 4/2005 | Sinfield |
| 2005/0208167 | A1 | 9/2005 | You et al. |
| 2005/0248053 | A1 | 11/2005 | Hyakutake et al. |
| 2006/0008547 | A1 | 1/2006 | Ohara |
| 2006/0055082 | A1 | 3/2006 | Kudo et al. |
| 2006/0086451 | A1 | 4/2006 | Nakata |
| 2006/0188593 | A1 | 8/2006 | Tanaka |
| 2006/0257511 | A1 | 11/2006 | Iwamoto et al. |
| 2007/0009623 | A1 | 1/2007 | Lahr et al. |
| 2008/0093010 | A1 | 4/2008 | Stuckey et al. |
| 2008/0300840 | A1 | 12/2008 | Tanaka et al. |

FOREIGN PATENT DOCUMENTS

| | | |
|---|---|---|
| JP | 09-309114 | 12/1997 |
| JP | 2005022279 | 1/2005 |
| JP | 2005-161609 | 6/2005 |
| JP | 2006-116887 | 5/2006 |
| JP | 2006281615 | 10/2006 |
| WO | 02055277 | 7/2002 |
| WO | PCT/JP02/07125 | 1/2003 |
| WO | 2004052589 | 6/2004 |
| WO | 2004062898 | 7/2004 |
| WO | 2005065923 | 7/2005 |

* cited by examiner

TIRE MOLD DESIGN METHOD TO MINIMIZE UNIQUE ANNULAR MOLD PARTS

FIELD OF INVENTION

The present disclosure is directed to a tire mold design process. More particularly, the present disclosure is directed to a tire mold design process that minimizes unique annular mold parts.

BACKGROUND

Tire companies use tire molds that have numerous components, including a housing, inner molding surfaces, and outer molding surfaces. The outer molding surfaces include a plurality of parts that form the tread surface onto the outer surface of a green tire. In addition, gaps between the plurality of parts allow for air evacuation during the tire molding process. The number of unique parts that form the tread surface directly relates to capital costs to create the mold, operating costs during the life of the tire mold, and the amount of air evacuation that occurs during tire molding.

SUMMARY

A method of designing a tire mold is disclosed, including the steps of designing an initial tire mold that includes a total number of annular mold pitches that each have a circumferential pitch length, wherein each of the total number of annular mold pitches have complementary leading and trailing edges. Further, the method includes the step of determining an initial number of unique annular mold pitch lengths that include an initial number of unique annular mold parts where each unique annular mold pitch length comprises more than one annular mold part, and adjacent annular mold parts have complementary leading and trailing edges. Another step includes replacing at least one of the initial number of unique annular mold pitch lengths with at least two of an actual number of unique annular mold parts to design and produce a final tire mold including an actual number of unique annular mold pitch lengths equal to or less than the initial number of unique annular mold pitch lengths, and the actual number of unique annular mold parts is less than the initial number of unique annular mold parts. An addition step may include rotating at least one of the initial number of unique annular mold parts 180 degrees and joining it to at least one other initial number of unique annular mold parts in a complementary arrangement.

BRIEF DESCRIPTION OF THE DRAWINGS

In the accompanying drawings, embodiments of a method of designing a tire mold to minimize unique annular mold parts are illustrated and, together with the detailed description provided below, show various embodiments of the tire mold design method. One of ordinary skill in the art will appreciate that a step may be designed as multiple steps, that multiple steps may be designed as a single step, or that the order of the steps can be in an alternative order.

Further, in the accompanying drawings and description that follow, like parts are indicated throughout the drawings and written description with the same reference numerals, respectively. Some of the figures may not be drawn to scale and the proportions of certain parts may have been exaggerated for convenience of illustration.

FIG. 4 illustrates a tread section of a tire mold having a plurality of annular mold pitch lengths that each have a plurality of annular mold parts;

DETAILED DESCRIPTION

The following definitions are provided to aid in the understanding of the invention. The definitions include various examples and/or forms of components that fall within the scope of a term and that may be used for implementation. The examples are not intended to be limiting. Both singular and plural forms of terms may be within the definitions.

"Annular mold" refers to a tire mold that includes individual annular mold parts that define a 360-degree tread ring configured to mold an annular tread pattern onto a green tire.

"Annular mold part" refers to an individual piece of the mold.

"Axial" and "axially" refer to a direction that is parallel to the axis of rotation of a tire.

"Circumferential" and "circumferentially" refer to a direction extending along the perimeter of the surface of the annular tread.

"Equatorial plane" refers to the plane that is perpendicular to the tire's axis of rotation and passes through the center of the tire's tread.

"Footprint" refers to the area of the tread of the tire that makes contact with the ground.

"Lateral" refers to a direction along the tread of the tire going from one sidewall to the other sidewall.

"Pitch" refers to a fundamental geometry and design of varying circumferential sizes that repeats about the equatorial plane of the tire to create the tire tread design pattern.

"Pitch length" refers to the circumferential length of each pitch.

"Pitch sequence" refers to the sequential arrangement of all of the pitches to create a 360 degree tire tread pattern.

"Radial" and "radially" refer to a direction perpendicular to the axis of rotation of the tire.

"Sidewall" refers to that portion of the tire between the footprint of the tread and the bead, so the sidewall includes the buttress portion as defined above.

"Total number of annular mold parts" refers to the number of annular mold parts that are assembled together to make the 360 degree tire tread pattern of the tire mold.

"Tread" refers to that portion of the tire that comes into contact with the road under normal inflation and load.

"Unique annular mold parts" refers to the number of geometrically unique annular mold parts, e.g., mold parts having a unique circumferential length, wherein the number of geometrically unique mold parts are duplicated to make the total number of annular mold parts that assemble to make the 360 degree tire tread portion of a tire mold.

Figure 1:
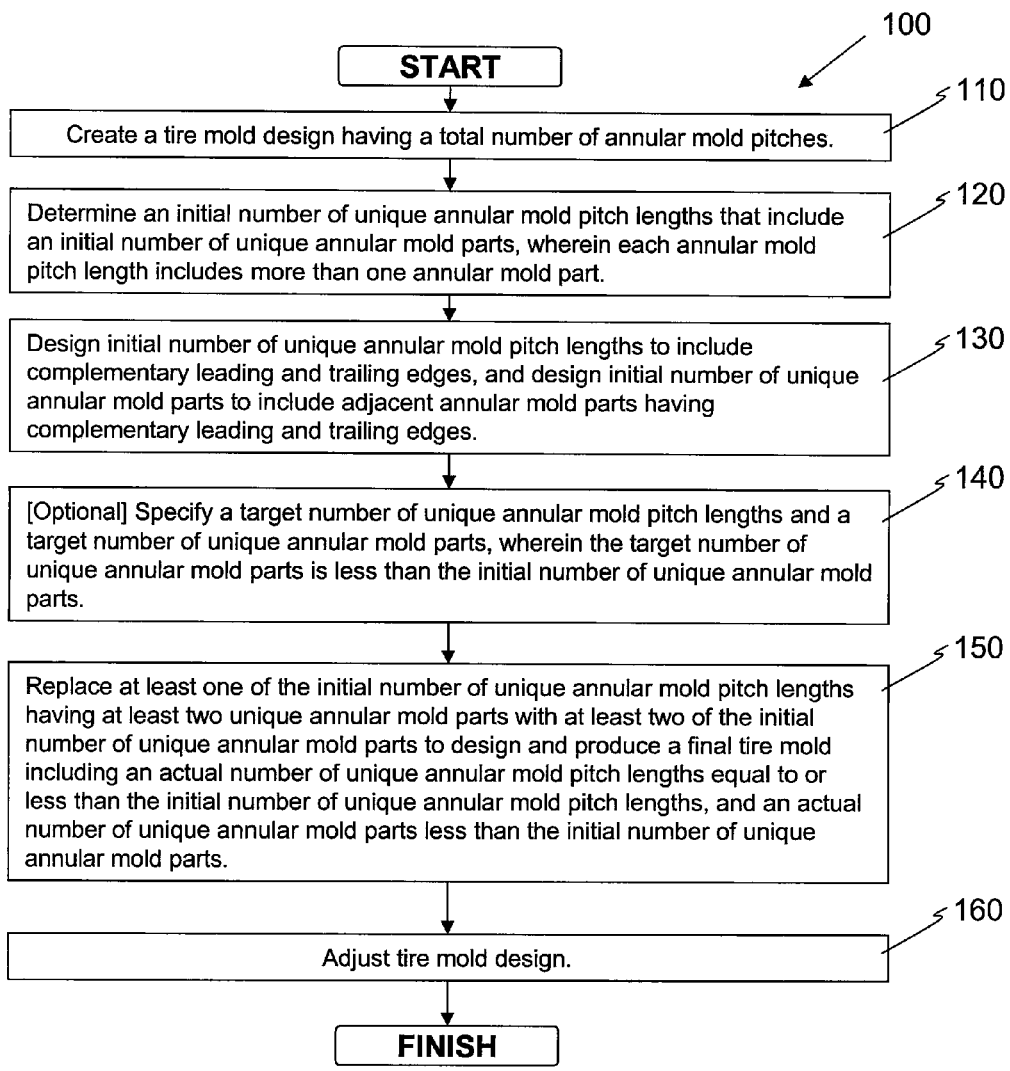
FIG. 1 illustrates a flow chart of one embodiment of a tire mold design method to minimize unique annular mold parts.

FIG. 1 is a flowchart of a tire mold design method that a tire design engineer uses to minimize a number of unique annular mold parts 100. A tire design engineer designs an initial tire mold having a total number of annular mold pitches that each have a circumferential length at 110. The tire design engineer then determines an initial number of unique annular mold pitch lengths that include an initial number of unique annular mold parts, wherein each annular mold pitch length includes more than one annular mold part at 120. For example, thirty to eighty individual annular mold pitches include two or more annular mold parts, wherein the annular mold parts circumferentially fit together inside the annular portion of the tire mold to form a tread portion of a tire, and a gap between the annular mold parts allows air to evacuate during tire molding.

The tire design engineer designs the initial number of unique annular mold pitch lengths to include complementary leading and trailing edges, and designs the initial number of unique annular mold parts so that adjacent annular mold parts have complementary leading and trailing edges at 130. At optional 140, the tire design engineer specifies a target number of unique annular mold pitch lengths and a target number of unique annular mold parts, wherein the target number of unique annular mold parts is less than the initial number of unique annular mold parts. At least one of the initial number of unique annular mold pitch lengths having at least two unique annular mold parts is replaced with at least two of the initial number of unique annular mold parts to design and produce a final tire mold including an actual number of unique annular mold pitch lengths equal to or less than the initial number of unique annular mold pitch lengths, and an actual number of unique annular mold parts is less than the initial number of unique annular mold parts at 150. The tire design engineer then adjusts the tire mold design at 160 so that the final tire mold has a minimum actual number of unique annular mold parts. In another embodiment (not shown), an initial number of unique annular mold pitch lengths is equal to m, wherein m is equal to at least two, and an initial number of unique annular mold parts is equal to at least 2 times m, the target number of unique annular mold pitch lengths is equal to or less than m and the target number of unique annular mold parts is equal to n, wherein n is less than 2 times m, and the actual number of unique annular mold pitch lengths is equal to or less than m and the actual number of unique annular mold parts is equal to p, wherein p is less than or equal to n.

Figure 2:
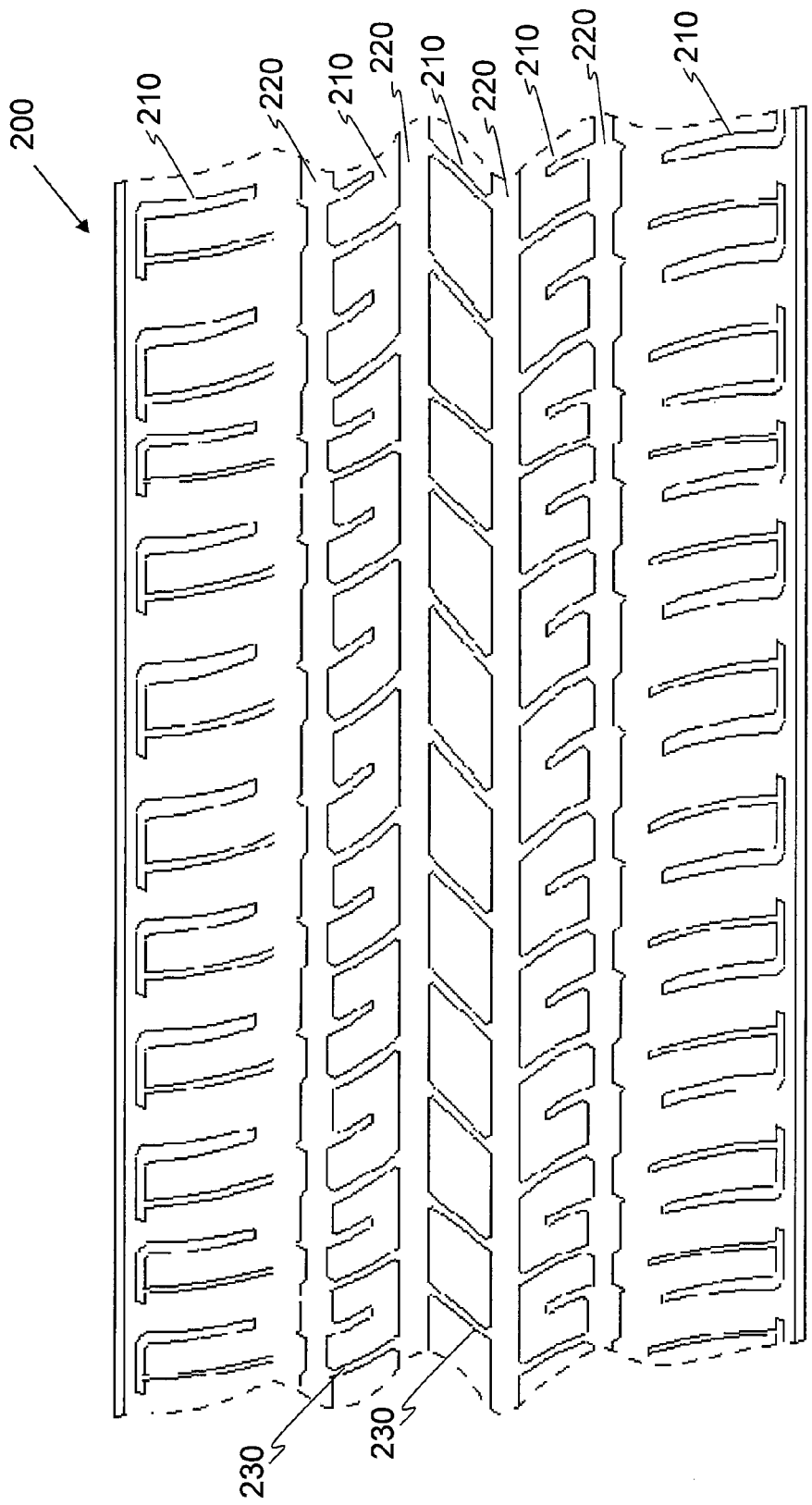
FIG. 2 illustrates a tread section of a tire mold.

FIG. 2 illustrates a tread section 200 of a tire mold (not shown) having a plurality of circumferential ribs 210, a plurality of circumferential grooves 220, and a plurality of lateral grooves 230. Although FIG. 2 illustrates a particular tread section having circumferential ribs, circumferential grooves, and lateral grooves described above, it should be understood that any combination of circumferential ribs, circumferential grooves, and lateral grooves may be employed.

Figure 3:
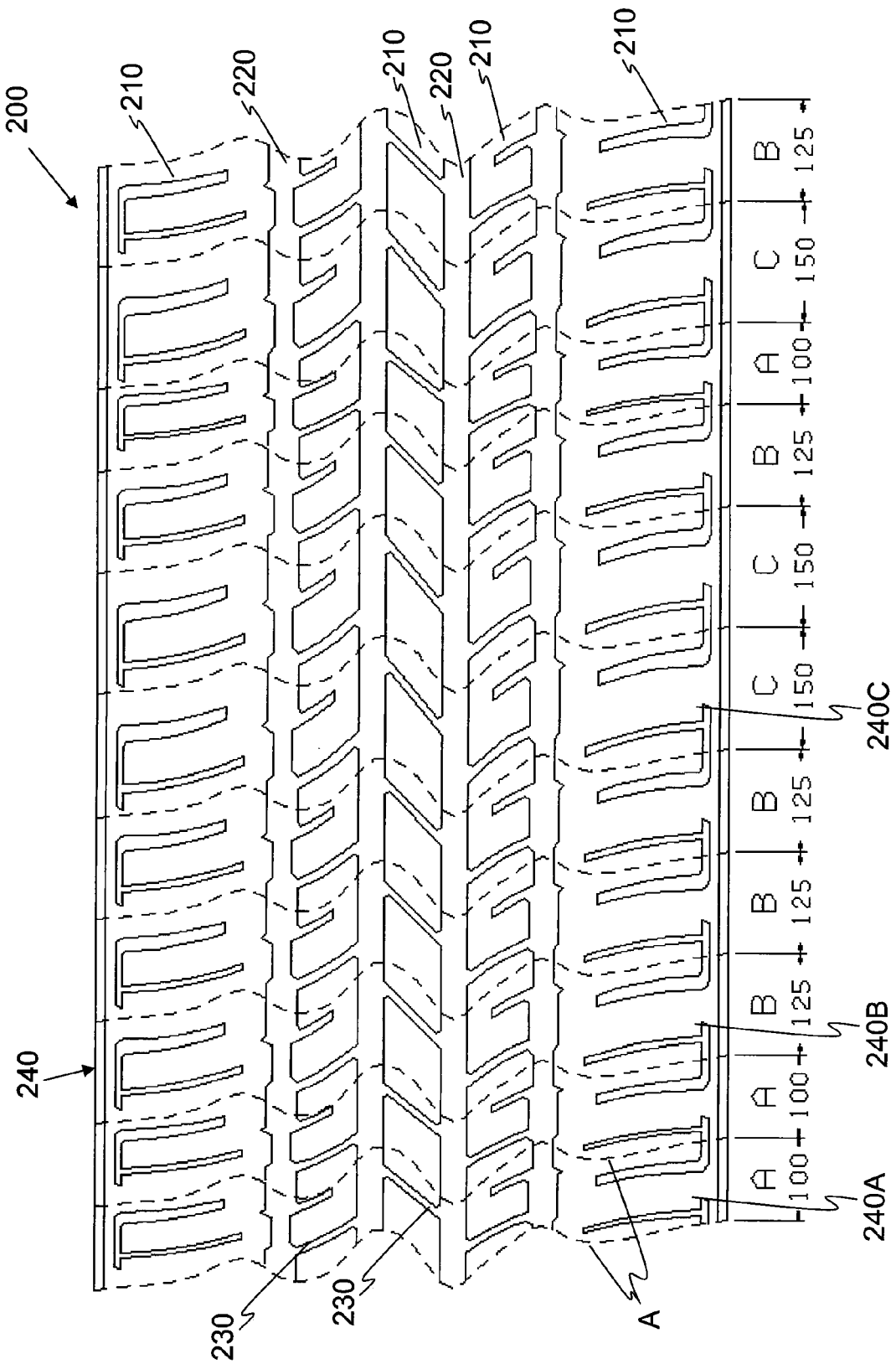
FIG. 3 illustrates a tread section of a tire mold having a plurality of annular mold pitch lengths.

FIG. 3 illustrates tread section 200 illustrated in FIG. 2 having a plurality of annular mold pitches 240, wherein annular mold pitch boundaries are indicated by dashed lines A. A tire tread portion of a tire mold includes a plurality of tread sections 200. A 360-degree tire mold has annular mold pitches that vary in number based on a radius of the tire mold and circumferential lengths of each annular mold pitch. In the illustrated embodiment, annular mold pitches 240 circumferentially fit together inside the annular portion of the tire mold (not shown) to form tread section 200. Tread section 200 illustrates eleven annular mold pitches, including three A-pitch lengths 240A, five B-pitch lengths 240B, and three C-pitch lengths 240C. Therefore, tread section 200 has three unique annular mold pitches 240, including A-pitch length 240A, B-pitch length 240B, and C-pitch length 240C. In another embodiment (not shown), tread section 200 includes less than or greater than eleven annular mold pitches. In yet another embodiment (not shown), tread section 200 includes less than or greater than three unique annular mold pitches, e.g., two and four to seven unique annular mold pitches.

In the illustrated embodiment, A-pitch length 240A, B-pitch length 240B, and C-pitch length 240C have circumferential lengths of 100 units, 125 units, and 150 units, respectively, wherein "units" refer to a linear length, e.g., inches or centimeters. Although FIG. 3 illustrates particular circumferential lengths, it should be understood that any combination of circumferential lengths may be employed.

Figure 4:
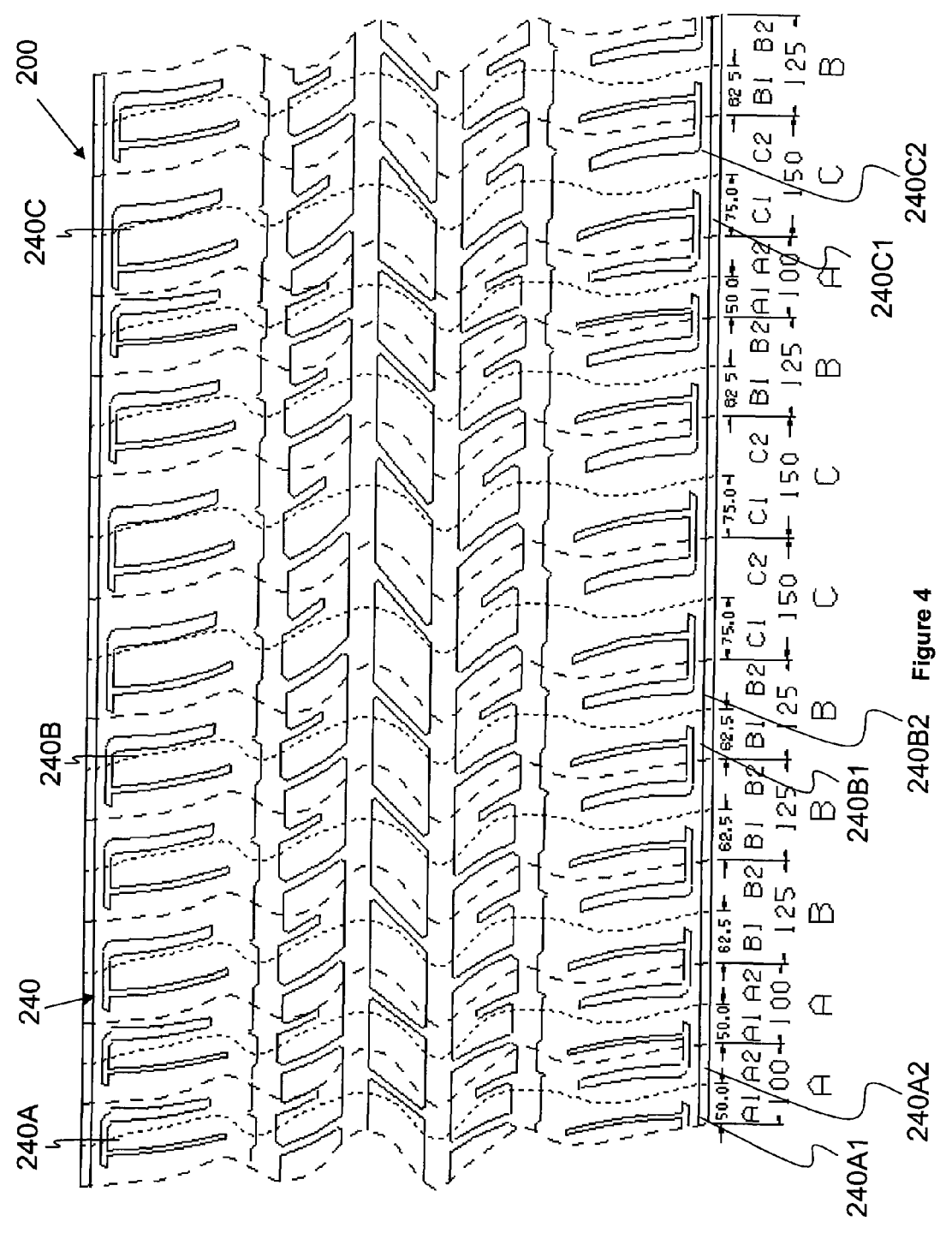

FIG. 4 illustrates tread section 200 having a plurality of annular mold pitches 240 illustrated in FIG. 3, wherein each annular mold pitch 240 includes more than one annular mold part. Specifically, A-pitch length 240A includes annular mold parts 240A1 and 240A2 that each have circumferential lengths of 50 units, B-pitch length 240B includes annular mold parts 240B1 and 240B2 that each have circumferential lengths of 62.5 units, and C-pitch length 240C includes annular mold parts 240C1 and 240C2 that each have circumferential lengths of 75 units. Therefore, the three unique annular mold pitch lengths 240A-C each include two unique annular mold parts, creating an initial number of unique annular mold parts equal to six.

In another embodiment (not shown), annular mold pitches 240 include a plurality of annular mold parts, including a first annular mold pitch split into a first number of annular mold parts and a second annular mold pitch split into a second number of annular mold parts, wherein the second number of annular mold parts is not equal to the first number of annular mold parts. For example, at least one of the three unique annular mold pitch lengths 240A-C illustrated in FIG. 4 includes at least three annular mold parts and at least one of the three annular mold pitch lengths 240A-C includes at least two annular mold parts, therefore, the three annular mold pitch lengths 240A-C include an initial number of annular mold parts equal to at least seven. In another embodiment (not shown), annular mold pitches include annular mold parts that have circumferential lengths that are a percentage of the annular mold pitch lengths of at least one of the following combinations: 50% and 50%, 33⅓%, 33⅓%, and 33⅓%, 25%, 25%, 25%, and 25%, 40% and 60%, 55% and 45%, 65% and 35%, 80% and 20%, 45%, 35%, and 20%, 45%, 30%, and 25%, 40%, 40%, and 20%, 60%, 20%, and 20%, and the like. Such combinations should be understood to be merely exemplary.

Figure 5:
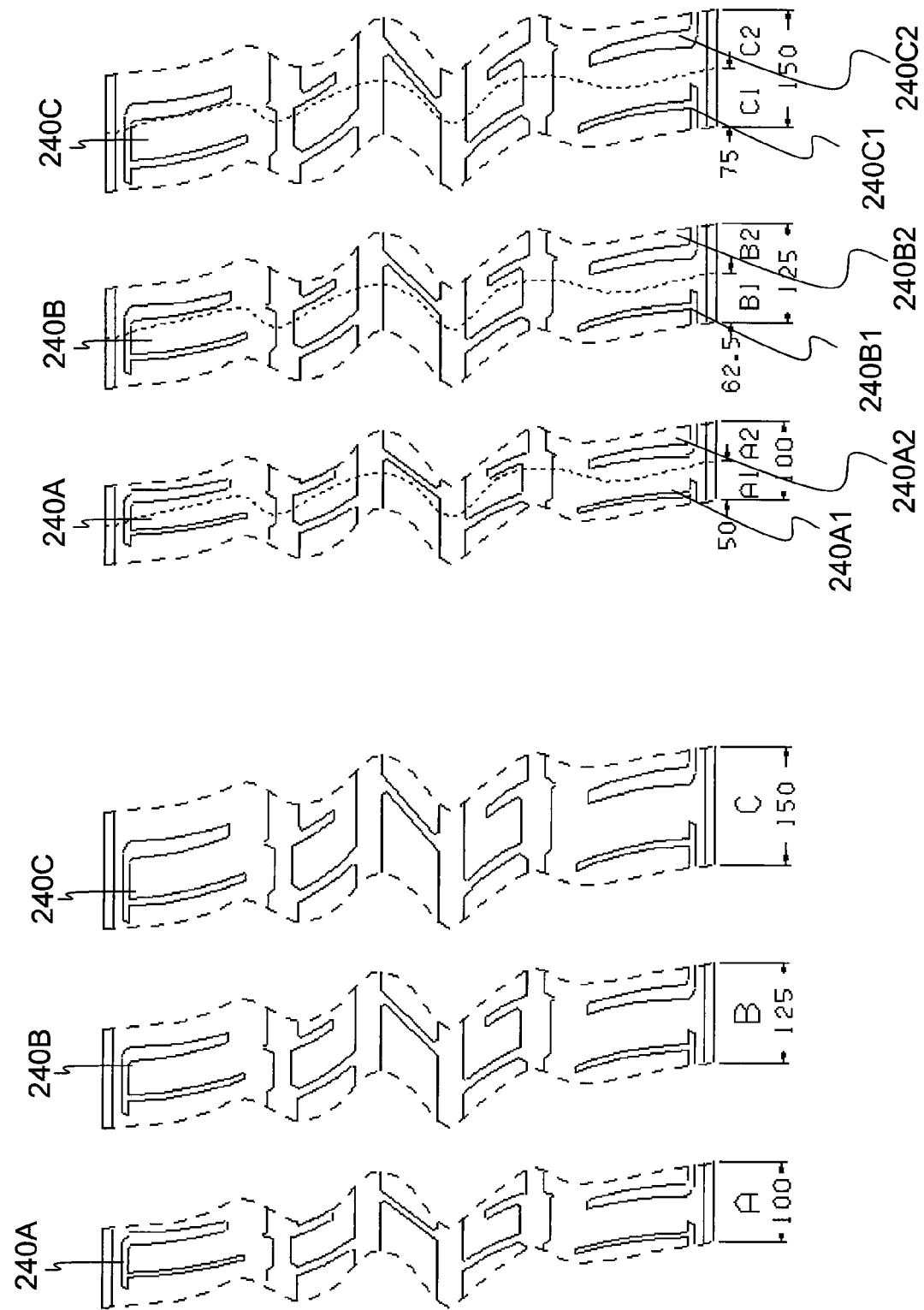
FIG. 5 illustrates annular mold pitch lengths and annular mold parts of the tire mold section illustrated in FIG. 4.
Figure 6:
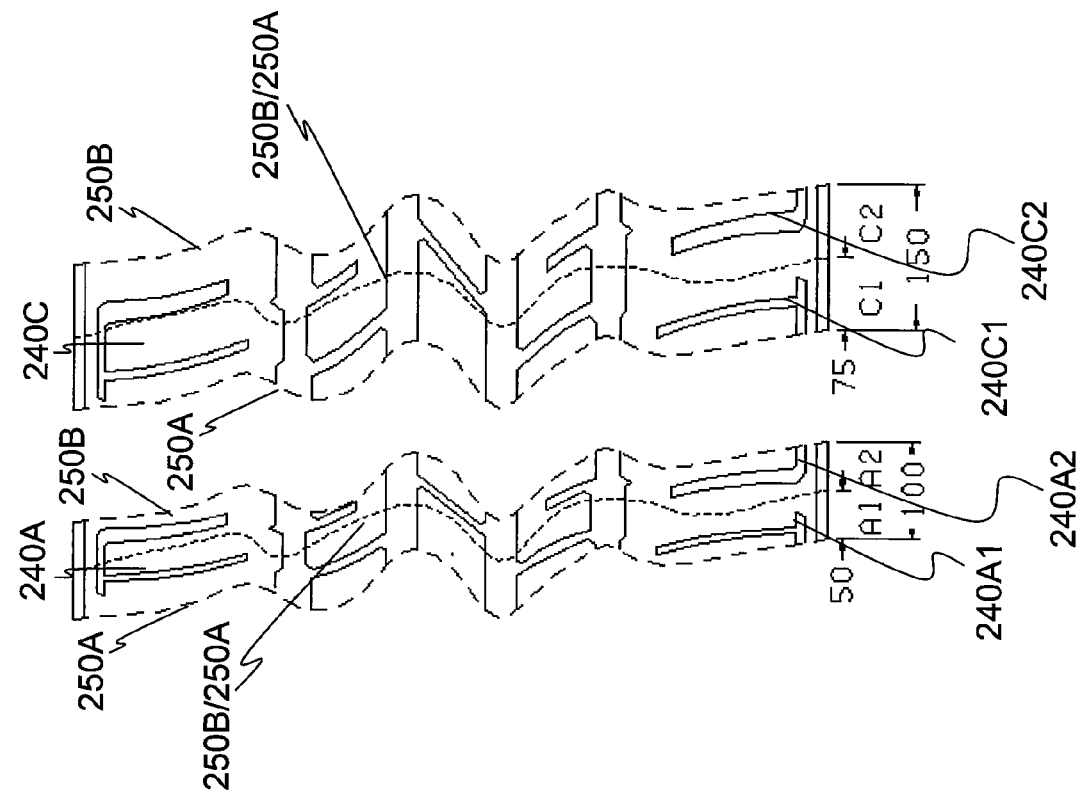
FIG. 6 illustrates annular mold pitch lengths and annular mold parts.
Figure 6:
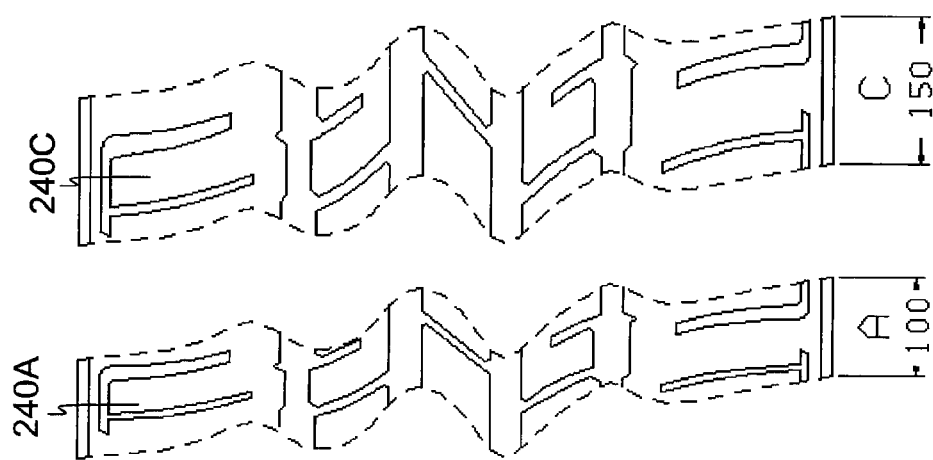

FIGS. 5 and 6 illustrate an optional portion of tire design method 100 where the tire design engineer specifies a target number of unique annular mold pitch lengths and a target number of unique annular mold parts, wherein the target number of unique annular mold parts is less than the initial number of unique annular mold parts. The target number of unique annular mold parts will be used to replace at least one of the initial number of unique annular mold pitch lengths and the corresponding unique annular mold parts to minimize the actual number of unique annular mold parts.

For example, the tire design engineer selects the three unique annular mold pitches 240A-C illustrated in FIG. 5 as a target number of unique annular mold pitch lengths, and selects the four unique annular mold parts illustrated in FIG. 6 as the target number of unique annular mold parts. Therefore, the tire design engineer selects to replace B-pitch length 240B and unique annular mold parts 240B1 and 240B2 illustrated in FIG. 5, i.e., selects to replace at least one of the initial unique annular mold pitches and related annular mold parts, with two or more of the initial unique annular mold parts illustrated in FIG. 6. Specifically, FIG. 5 illustrates the three initial unique annular mold pitches 240A-C including six unique annular mold parts: 240A1, 240A2, 240B1, 240B2, 240C1, and 240C2. FIG. 6 illustrates the two remaining unique annular mold pitches 240A and 240C having the four remaining unique annular mold parts: 240A1, 240A2, 240C1, and 240C2. FIG. 6 also illustrates that unique annular mold pitches 240A and 240C and unique annular mold parts 240A1, 240A2, 240C1, and 240C2 include complementary leading edges 250A and trailing edges 250B. All unique annular mold pitches must have complementary leading and trailing edges, but only circumferentially adjacent annular mold parts need to have complementary leading and trailing edges. In another embodiment (not shown), more than one unique annular mold pitch is replaced with one or more unique annular mold part.

Figure 7:
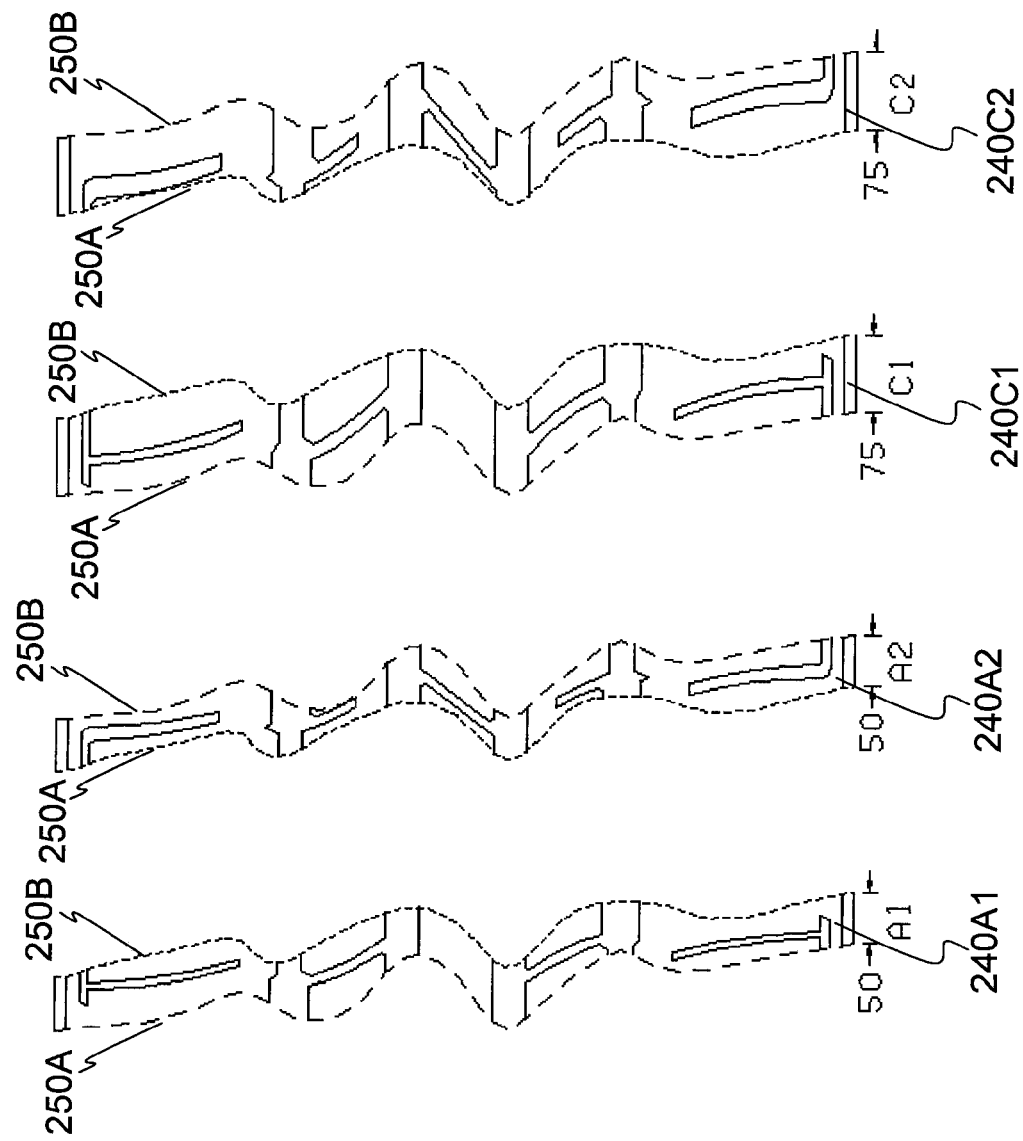
FIG. 7 illustrates a plurality of annular mold parts.

FIG. 7 illustrates unique annular mold parts 240A1, 240A2, 240C1, and 240C2 from FIG. 6 that have complementary leading edges 250A and trailing edges 250B. Because annular mold parts 240A1 and 240A2 have circumferential lengths of 50 units and annular mold parts 240C1 and 240C2 have circumferential lengths of 75 units, combinations of these four annular mold parts can form annular mold pitches having circumferential lengths of 100, 125, and 150 units (the three circumferential lengths of the annular mold pitches). In another embodiment (not shown), the annular mold parts have complementary leading edges 250A and trailing edges 250B only for annular mold parts that are circumferentially adjacent to each other, so annular mold parts that are not circumferentially adjacent to each other can have non-complementary leading and trailing edges.

Figure 8:
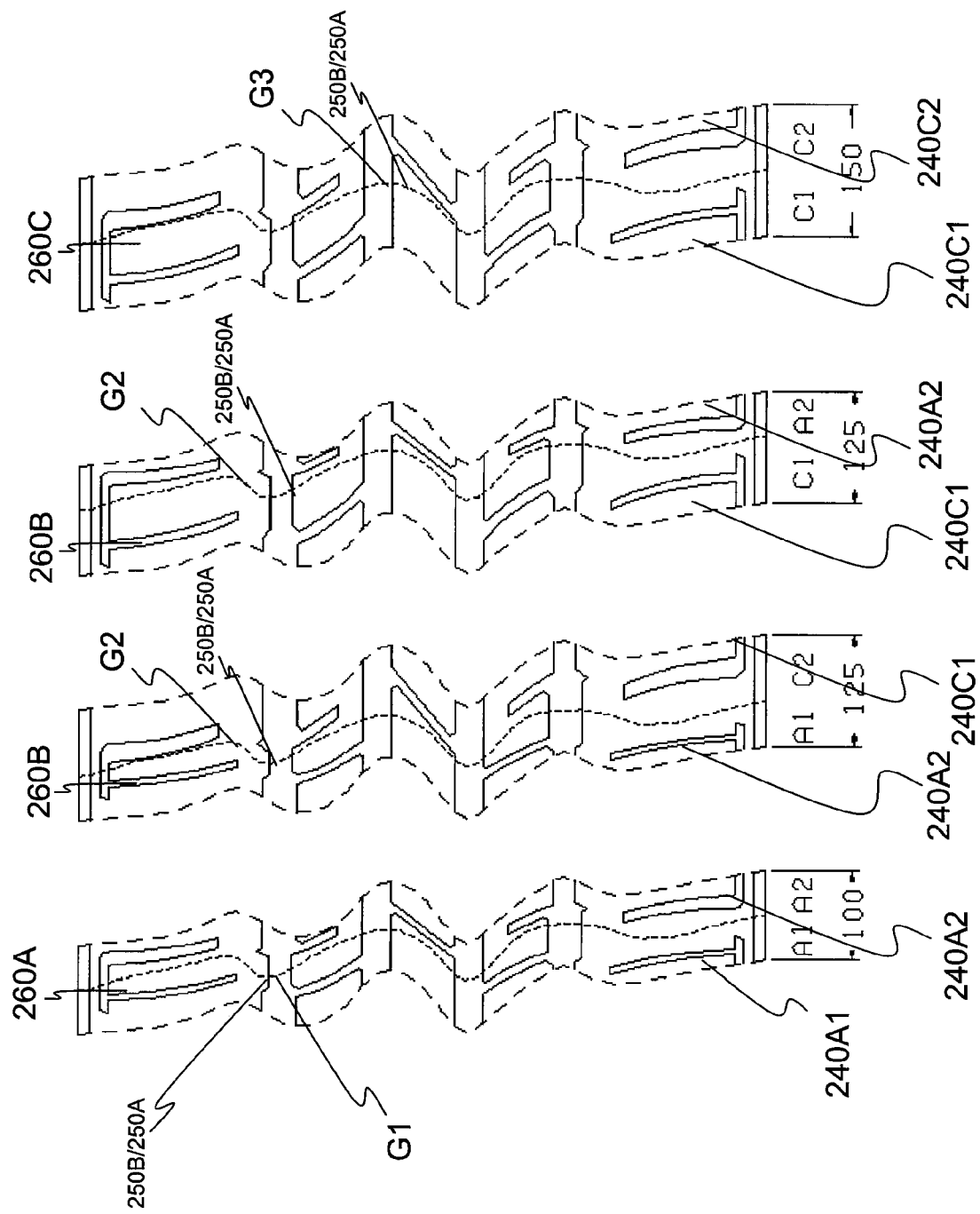
FIG. 8 illustrates annular mold pitch lengths made from annular mold parts illustrated in FIG. 7.
Figure 9:
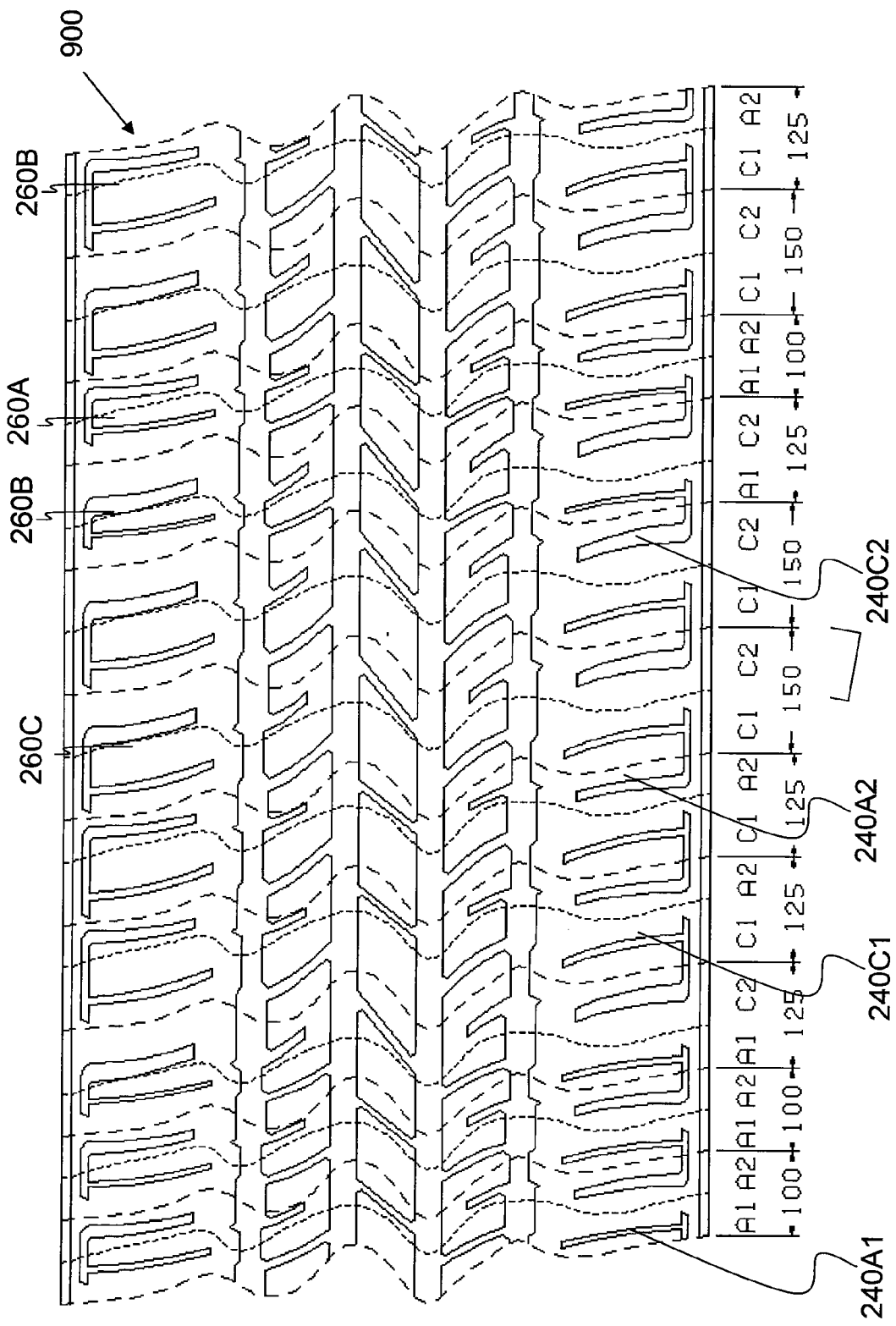
FIG. 9 illustrates a tread section of a tire mold having a plurality of annular mold pitch lengths illustrated in FIG. 8 designed from annular mold parts illustrated in FIG. 7.

FIG. 8 illustrates a plurality of annular mold pitches 260A, 260B, 260B, and 260C having circumferential lengths of 100, 125, 125, and 150 units, respectively, that are made from the four unique annular mold parts illustrated in FIG. 7. Annular mold section size 260A includes annular mold parts 240A1 and 240A2 each having a circumferential length of 50 units for a combined circumferential length of 100 units. Annular mold section size 260B includes annular mold part 240A1 having a circumferential length of 50 units and annular mold part 240C2 having a circumferential length of 75 units for a combined circumferential length of 125 units. Alternatively, annular mold section size 260B can include annular mold part 240C1 having a circumferential length of 75 units and annular mold part 240A2 having a circumferential length of 50 units for a combined circumferential length of 125 units. Lastly, annular mold section size 260C includes annular mold part 240C1 and 240C2 each having circumferential lengths of 75 units for a combined circumferential length of 150 units. In summary, three unique annular mold pitch lengths consist of four unique annular mold parts, not six as in the initial design.

In another embodiment (not shown), at least one of the actual unique annular mold parts can be rotated 180 degrees to replace at least one of the other actual unique annular mold parts, so there are only at most three unique annular mold parts. In yet another embodiment (not shown), the annular mold pitches include a number of annular mold parts greater than two. In another embodiment (not shown), at least two annular mold parts of an annular mold pitch have a plurality of circumferential lengths that are equal. In yet another embodiment (not shown), the annular mold parts of an annular mold pitch include a plurality of circumferential lengths that are not equal.

In the illustrated embodiment, trailing edge 250B of each annular mold part can join to leading edge 250A of each other annular mold part to form an annular mold pitch length and leave a small gap for air evacuation during tire molding. For example, trailing edge 250B of annular mold part 240A1 joins to leading edge 250A of annular mold part 240A2 to form A-pitch length 260A having a small gap G1. Likewise, trailing edge 250B of annular mold part 240A2 joins to leading edge 250A of annular mold part 240C1 to form B-pitch length 260B having a small gap G2. In addition, trailing edge 250B of annular mold part 240C1 joins to leading edge 250A of annular mold part 240A2 to form another B-pitch length 260B having a small gap G2. Trailing edge 250B of annular mold part 240C1 joins to leading edge 250A of annular mold part 240C2 to form C-pitch length 260B having a small gap G3. In another embodiment (not shown), the annular mold parts, pitch lengths, and gaps vary from what is illustrated in FIG. 8.

Although FIGS. 1-9 illustrates a particular number of initial, target, and actual annular mold pitches and annular mold parts, it should be understood that any combination of initial, target, and actual annular mold pitches and annular mold parts may be employed. For example, tire design method 100 includes the initial number of unique annular mold pitch lengths is equal to m, wherein m is equal to at least two, and an initial number of unique annular mold parts is equal to at least 2 times m, the optional target number of unique annular mold pitch lengths is equal to or less than m and the optional target number of unique annular mold parts is equal to n, wherein n is less than 2 times m, and the actual number of unique annular mold pitch lengths is equal to or less than m and the actual number of unique annular mold parts is equal to p, wherein p is less than or equal to n.

Figure 10:
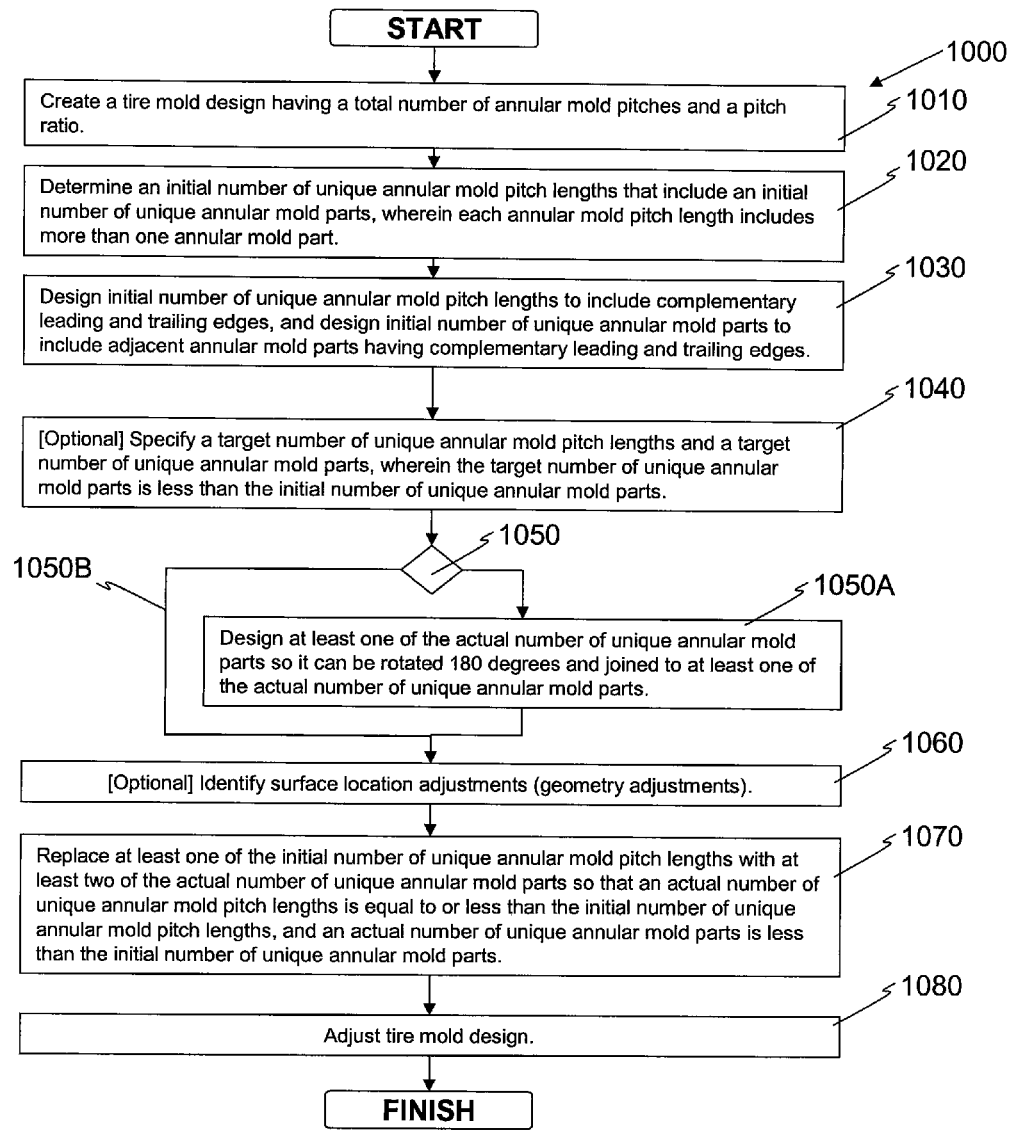
FIG. 10 illustrates a flow chart of another embodiment of a tire mold design method to minimize unique annular mold parts.

FIG. 10 is a flowchart that illustrates another embodiment of a tire mold design method that allows a tire design engineer to minimize the unique number of annular mold parts 1000. As shown in FIG. 10, a tire design engineer designs an initial tire mold having a total number of annular mold pitches and a pitch ratio at 1010. The pitch ratio is the ratio of the largest circumferential length to the smallest circumferential length. In the tire mold design method, a tire design engineer selects the pitch ratio from one of the following: greater than 1, between 1 and 2, and 1.5. For example, a tire mold having sixty-two mold sections that circumferentially fit together inside a tire mold has a pitch ratio of 1.5. The tire design engineer determines an initial number of unique annular mold pitch lengths that include an initial number of unique annular mold parts, wherein each annular mold pitch length includes more than one annular mold part at 1020.

The tire design engineer designs the initial number of unique annular mold pitch lengths to include complementary leading and trailing edges, and designs the initial number of unique annular mold parts so that circumferentially adjacent annular mold parts have complementary leading and trailing edges at 1030. At optional 1040, the tire design engineer specifies a target number of unique annular mold pitch lengths and a target number of unique annular mold parts, wherein the target number of unique annular mold parts is less than the initial number of unique annular mold parts.

At 1050, the tire design engineer decides to include a rotatable design wherein at least one of the actual number of unique annular mold parts can be rotated 180 degrees and joined to at least one of the actual number of unique annular mold parts at 1050A, or the tire design engineer decides not to include this rotatable design feature in the tire mold design at 1050B. If the tire design engineer selects the rotatable design feature, the actual number of unique annular mold parts can be reduced by at least one relative to a design without the rotatable design feature. At optional 1060, the tire design engineer indentifies surface locations and makes needed adjustments, e.g., geometry adjustments.

At least one of the initial number of unique annular mold pitch lengths is replaced with at least two of the actual number of unique annular mold parts to design and produce a final tire mold including an actual number of unique annular mold pitch lengths equal to or less than the initial number of unique annular mold pitch lengths, and the actual number of unique annular mold parts is less than the initial number of unique annular mold parts at 1070. The tire design engineer then adjusts the tire mold design at 1080 so that tires are produced in a tire mold with a minimum number of unique annular mold parts. In another embodiment (not shown), the initial number of unique annular mold pitch lengths is equal to m, wherein m is equal to at least two, and an initial number of unique annular mold parts is equal to at least 2 times m, the optional target number of unique annular mold pitch lengths is equal to or less than m and the optional target number of unique annular mold parts is equal to n, wherein n is less than 2 times m minus at least 1 because of the rotatable design feature, and the actual number of unique annular mold pitch lengths is equal to or less than m and the actual number of unique annular mold parts is equal to p, wherein p is less than or equal to n.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A method of designing a tire mold, the method comprising:
    designing an initial tire mold, on a computer, that includes a total number of annular mold pitches, each having a circumferential pitch length, wherein each of the total number of annular mold pitches have complementary leading and trailing edges;
    determining an initial number of unique annular mold pitch lengths that include an initial number of unique annular mold parts, wherein each unique annular mold pitch length comprises more than one annular mold part, and wherein the adjacent annular mold parts have complementary leading and trailing edges;
    specifying a target number of unique annular mold pitch lengths and a target number of unique annular mold parts, wherein the target number of unique annular mold parts is less than the initial number of unique annular mold parts, wherein the initial number of unique annular mold pitch lengths is at least three and the initial number of unique annular mold parts is equal to at least six, and wherein the target number of unique annular mold pitch lengths is equal to or less than three and the target number of unique annular mold parts is less than six; and
    replacing at least one of the initial number of unique annular mold pitch lengths with at least two of an actual number of unique annular mold parts to design and produce a final tire mold including an actual number of unique annular mold pitch lengths equal to or less than the initial number of unique annular mold pitch lengths, and the actual number of unique annular mold parts is less than the initial number of unique annular mold parts.

2. The method of designing a tire mold according to claim 1, further including specifying a target number of unique annular mold pitch lengths and a target number of unique annular mold parts, wherein the target number of unique annular mold parts is less than the initial number of unique annular mold parts, and wherein the initial number of unique annular mold pitch lengths is equal to m, wherein m is equal to at least two, and the initial number of unique annular mold parts is equal to at least 2 times m, the target number of unique annular mold pitch lengths is equal to or less than m and the target number of unique annular mold parts is equal to n, wherein n is less than 2 times m, and the actual number of unique annular mold pitch lengths is equal to or less than m and the actual number of unique annular mold parts is equal to p, wherein p is less than or equal to n.

3. The method of designing a tire mold according to claim 1, wherein the initial number of unique annular mold pitch lengths is between 2 and 7 and the initial number of unique annular mold parts is between 4 and 28.

4. The method of designing a tire mold according to claim 1, wherein the actual number of unique annular mold parts are equal in circumferential length.

5. The method of designing a tire mold according to claim 1, wherein the actual number of unique annular mold parts are not equal in circumferential length.

6. The method of designing a tire mold according to claim 1, wherein at least two of the actual number of unique annular mold parts are equal in circumferential length.

7. The method of designing a tire mold according to claim 1, wherein at least two of the actual number of unique annular mold parts are not equal in circumferential length.

8. The method of claim 1, wherein the annular mold parts have complementary leading edges and trailing edges only for annular mold parts that are circumferentially adjacent to each other.

9. A method of making a tire mold, the method comprising:
    designing an initial tire mold that includes a total number of annular mold pitches, each having a circumferential pitch length, wherein each of the total number of annular mold pitches have complementary leading and trailing edges;
    determining an initial number of unique annular mold pitch lengths that include an initial number of unique annular mold parts, wherein each unique annular mold pitch length comprises more than one annular mold part;
    designing the initial number of unique annular mold parts to include adjacent annular mold parts having complementary leading and trailing edges, and wherein at least one of the initial number of unique annular mold parts can rotate 180 degrees and join to at least one other initial number of unique annular mold parts in a complementary arrangement;

specifying a target number of unique annular mold pitch lengths and a target number of unique annular mold parts, wherein the target number of unique annular mold parts is less than the initial number of unique annular mold parts; and replacing at least one of the initial number of unique annular mold pitch lengths with at least two actual unique annular mold parts to design and produce a final tire mold including an actual number of unique annular mold pitch lengths equal to or less than the initial number of unique annular mold pitch lengths, and the actual number of unique annular mold parts is less than the initial number of unique annular mold parts.

10. The method of making a tire mold according to claim 9, wherein the initial number of unique annular mold pitch lengths is at least three and the initial number of annular mold parts is equal to at least six, and wherein the target number of unique annular mold pitch lengths is equal to or less than three and the target number of unique annular mold parts is less than five.

11. The method of making a tire mold according to claim 9, wherein the initial number of unique annular mold pitch lengths is equal to m, wherein m is equal to at least two, and the initial number of unique annular mold parts is equal to at least 2 times m, the target number of unique annular mold pitch lengths is equal to or less than m and the target number of unique annular mold parts is equal to n, wherein n is less than 2 times m minus 1, and the actual number of unique annular mold pitch lengths is equal to or less than m and the actual number of unique annular mold parts is equal to p, wherein p is less than or equal to n.

12. The method of making a tire mold according to claim 9 further comprising selecting a pitch ratio, wherein the pitch ratio is a ratio of a longest circumferential mold section size and a shortest circumferential mold section size, wherein the pitch ratio is between 1 and 2.

13. A tire mold obtained by the process of:
designing an initial tire mold that includes a total number of annular mold pitches, each having a circumferential pitch length, wherein each of the total number of annular mold pitches have complementary leading and trailing edges;
determining an initial number of unique annular mold pitch lengths and an initial number of unique annular mold parts, wherein each unique annular mold pitch comprises more than one annular mold part, and wherein circumferentially adjacent annular mold parts have complementary leading and trailing edges; and
replacing at least one of the initial number of unique annular mold pitch lengths with at least two of an actual number of unique annular mold parts to design and produce a final tire mold having the actual number of unique annular mold parts less than the initial number of unique annular mold parts; and
specifying a target number of unique annular mold parts, wherein the target number of unique annular mold parts is less than the initial number of unique annular mold parts; wherein the initial number of unique annular mold pitch lengths is at least three and the initial number of annular mold parts is equal to at least six, and the target number of unique annular mold parts is less than six.

14. The method of designing a tire mold of claim 13, wherein the actual number of unique annular mold parts include complementary leading and trailing edges.

15. The method of designing a tire mold of claim 13, further including specifying a target number of unique annular mold parts, wherein the target number of unique annular mold parts is less than the initial number of unique annular mold parts;
wherein the initial number of unique annular mold pitch lengths is equal to m and the initial number of annular mold parts is equal to at least 2 times m, and the target number of unique annular mold parts is less than at least 2 times m.

16. The method of designing a tire mold of claim 13 further comprising selecting a pitch ratio equal to 1.5, wherein the pitch ratio is a ratio of a longest circumferential mold section size and a shortest circumferential mold section size.

17. The method of designing a tire mold of claim 13, wherein the actual number of unique annular mold parts are equal in circumferential length.

18. The method of designing a tire mold of claim 13, wherein at least two of the actual number of unique annular mold parts are equal in circumferential length.

19. The method of designing a tire mold of claim 13, wherein the actual number of unique annular mold parts have circumferential length proportions selected from one of the following: 50% and 50%, 33⅓%, 33⅓%, and 33⅓%, 25%, 25%, 25%, and 25%, 40% and 60%, 55% and 45%, 65% and 35%, 80% and 20%, 45%, 35%, and 20%, 45%, 30%, and 25%, 40%, 40%, and 20%, 60%, 20%, and 20%.

20. The method of claim 13, wherein at least two annular mold parts of an annular mold pitch have a plurality of circumferential lengths that are equal.

\* \* \* \* \*